Figures 1, 2:
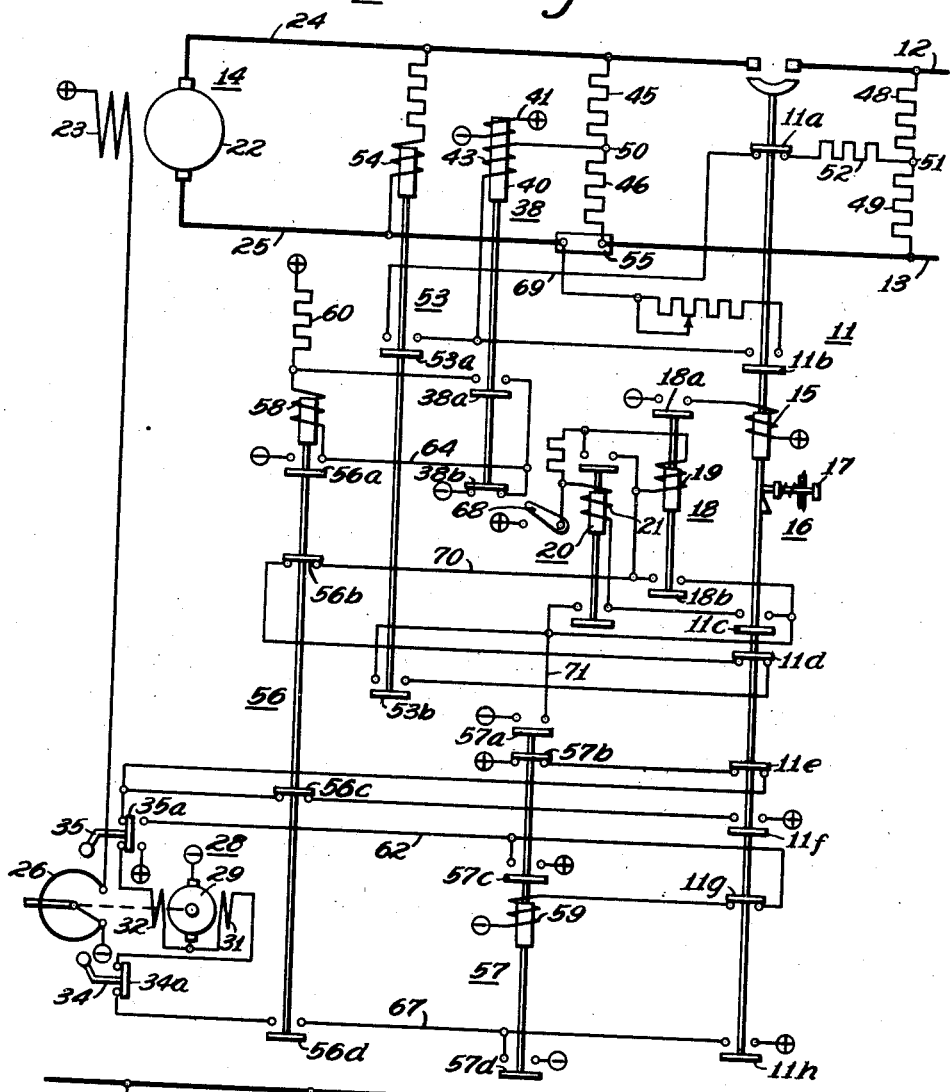

Aug. 16, 1949.  W. R. TALIAFERRO  2,479,430
CIRCUIT BREAKER CONTROL SYSTEM
Filed Oct. 7, 1947

WITNESSES:
R. C. Baird
F. V. Giolma

INVENTOR
William R. Taliaferro.
BY
G. M. Crawford
ATTORNEY

Patented Aug. 16, 1949

2,479,430

UNITED STATES PATENT OFFICE 2,479,430

CIRCUIT BREAKER CONTROL SYSTEM

William R. Taliaferro, Edgewood, Pa., assignor to Westinghouse Electric Corporation, East Pittsburgh, Pa., a corporation of Pennsylvania Application October 7, 1947, Serial No. 778,431

11 Claims. (Cl. 171—118)

My invention relates, generally, to circuit breaker control systems, and it has reference, in particular, to automatic reclosing systems for circuit breakers.

Generally stated, it is an object of my invention to provide an automatic reclosing system for a circuit breaker which is simple and inexpensive to manufacture, and is effective and reliable in operation.

More specifically, it is an object of my invention to provide in an automatic reclosing system for circuit breakers for utilizing one relay for performing several different functions.

Another object of my invention is to provide for reducing a number of control relays necessary in an automatic reclosing system for a circuit breaker.

Yet another object of my invention is to provide, in a reclosing system for a circuit breaker, for so connecting a control relay in a bridge circuit between a load circuit and a source for measuring a voltage differential therebetween as not to subject the relay to the full voltage of the source.

Another object of my invention is to provide, in a reclosing system for a circuit breaker, for using a polarized relay for determining the direction of a voltage differential between a source and a load circuit prior to reclosing the circuit breaker, and also for regulating the voltage of the source in accordance with the load current after reclosing.

It is also an object of my invention to provide, in a reclosing system for a circuit breaker, for utilizing a common control device for checking the voltages of the source and load circuits, controlling the source voltage so as to provide for reclosing, closing the circuit breaker, and then regulating the voltage of the source in accordance with the load current.

Other objects will in part be obvious, and will in part be explained hereinafter.

In practicing my invention in one of its forms, a circuit breaker for connecting a load circuit to a power source is provided with the usual closing and cutoff relays. A polarized control relay, which is connected across a shunt in the load circuit when the circuit breaker is closed, operates when the circuit breaker opens to set up an operating circuit for raising the voltage of the source to a reclosing value. When the voltage of the source reaches a predetermined reclosing value, the control relay is connected in a bridge circuit between the load and the source so as to measure the relative voltages thereof without being subjected to the full voltage of the source. When the voltage of the source exceeds that of the load circuit, the control relay completes an operating circuit for the closing relay. The circuit breaker, in closing, reconnects the control relay to the shunt so that it operates to regulate the voltage of the source in accordance with load current.

For a more complete understanding of the nature and scope of my invention, reference may be made to the following detailed description, which may be read in connection with the accompanying drawing, in which:

Figure 1 is a diagrammatic view of an automatic reclosing control system embodying the invention in one of its forms, and Fig. 2 is a diagrammatic view of a portion of an automatic reclosing system illustrating a modification of the invention.

Referring to Fig. 1 of the drawing, the reference numeral 10 may denote, generally, an automatic reclosing system for a circuit breaker 11 which may be disposed to connect a load circuit represented by the conductors 12 and 13, to a source of electrical energy such as the generator 14.

The circuit breaker 11 may be of any suitable type being, for example, provided with an operating winding 15 and latch means 16 including a releasable trip member 17, which may be retracted by suitable trip means (not shown) in response to overload or any other fault condition for opening the circuit breaker. The breaker may be provided with a closing relay 18 having an operating winding 19, and a cut-off relay 20 having an operating winding 21, for closing the circuit breaker in a manner well known in the art.

The generator 14 may be of any suitable type, comprising, for example, an armature 22 and a field winding 23. The armature may be connected to the load circuit conductors 12 and 13 by conductors 24 and 25, respectively. The field winding 23 may be energized from a suitable source, which may be represented by the positive and negative terminal markings, as shown.

In order to vary the voltage of the generator 14, a field rheostat 26 may be connected in circuit relation with the field winding 23 and provided with an operating motor 28 comprising an armature 29 with "raise" and "lower" field windings 31 and 32 for operating the motor to raise and lower the voltage of the generator 14, respectively. Suitable limit switches 34 and 35 may be provided in circuit relation with the field windings 31 and 32, respectively, for disconnecting the field windings when the rheostat 26 is operated to its extreme positions.

In order to provide for controlling the generator voltage so that it is slightly higher than the voltage of the load circuit before reclosing; to check the direction of the differential between the generator and load circuit voltages; close the circuit breaker; and regulate the voltage of the generator so that it does not take more than its share of the load, and so that the generator voltage is reduced upon overload to limit the resultant current, a single control device such as the polarity responsive, or polarized control relay 38 may be provided.

The relay 38 may be of any suitable type which is responsive to the directional flow of current therethrough, and may comprise either a neutral relay polarized by means of rectifier devices, or a relay of the D'Arsonval type having a polarizing winding and a moving coil-type operating winding. For purposes of illustration, the polarized relay 38 is shown as comprising a movable armature 40 having a polarizing winding 41, which is connected to a suitable source of direct current control voltage, and an operating winding 43.

In order to provide for determining the direction of a differential voltage existing between the load circuit and the source when the circuit breaker 11 is open, voltage dividers comprising resistors 45, 46 and 48, 49 may be connected across the conductors 23, 24 and 13, 14. The voltage dividers may be provided with terminal points 50 and 51 intermediate the resistors 45, 46 and 48, 49, respectively. A voltage responsive relay 53 having an operating winding 54 may be provided for connecting the operating winding 43 of the control relay 38 between the terminal points 50 and 51 in circuit relation with a control resistor 52 when the circuit breaker 11 is open, so as to connect it in a bridge circuit between the source and the load circuit. The operating winding 54 of the voltage relay may be connected between the supply conductors 23 and 24 so as to provide for connecting the operating winding 43 in the bridge circuit, only when the voltage of the generator 14 reaches a predetermined value. A shunt 55 may be connected between the conductors 13 and 25 for use in connection with the control relay 38, as will be explained hereinafter.

In order to provide for controlling the voltage of the generator 14 in accordance with operation of the control relay 38, auxiliary control relays 56 and 57 may be provided having operating windings 58 and 59, respectively.

With the circuit breaker in the open position, as shown, the voltage of the generator 14 will be reduced to its minimum value, since an operating circuit is provided upon opening of the breaker for the "lower" field winding 32 of the rheostat motor 28 extending from the negative terminal through the armature 29, "lower" field winding 32, contact member 35a of the limit switch 35, contact member 11e of the circuit breaker 11, and contact member 57b of the auxiliary control relay 57 to positive. Accordingly, the rheostat motor 28 operates to lower the generator voltage as soon as the breaker opens, until the limit switch 35 operates to interrupt the aforesaid operating circuit.

Operation of the limit switch 35 completes an energizing circuit for the operating winding 59 of the auxiliary control relay 57, extending from negative through the operating winding 59, contact member 11g, conductor 62 and contact member 35a to positive. The auxiliary control relay 57 operates, providing a holding circuit for itself through contact member 57c and setting up an operating circuit for raising the voltage of the generator 14 through contact member 57d.

When the circuit breaker 11 opens, the operating winding 43 is disconnected from the shunt 55 by the opening of contact member 11b. Accordingly, the control relay 38 returns to the deenergized position, providing an operating circuit for the auxiliary control relay 56, extending from negative through contact member 38b, conductor 64, operating winding 58 and control resistor 60 to positive. The auxiliary control relay 56 thereupon operates, providing a holding circuit through contact member 56a and completing an energizing circuit in the raise field winding 31 of the rheostat motor 28, extending from negative through contact member 57d, conductor 67, contact members 56d and 34a, field winding 31 and armature 29 to negative.

At some suitable value of voltage, say 2,000 volts, for example, for a 3,000 volt system, the voltage relay 53 operates, and sets up an energizing circuit for the closing relay 18 through contact member 53b. At the same time, contact member 53a completes the connection of the operating winding 43 of the control relay 38 between the terminal points 50 and 51 for measuring the voltage differential between the generator 14 and the load circuit conductors 12 and 13. If the voltage of the load circuit conductors is higher than the generator voltage, a current flows through the operating winding 43 through a circuit extending from the conductor 12 through resistor 48, resistor 52, contact member 11a, contact member 53a, operating winding 43, terminal point 50, and resistor 46 to the negative side of the system. This current is of such a polarity as to keep the control relay 38 in the deenergized position, and maintain the auxiliary control relay 56 in the energized position to provide an operating circuit for continuing to raise the voltage of the generator 14.

When the voltage of the generator 14 is sufficiently high so that the voltage of the conductors 24 and 25 exceeds that of the conductors 12 and 13 by a suitable amount, usually about one per cent, a current flows through the operating winding 43 of the control relay 38 through a circuit extending from conductor 24, resistor 45, operating winding 43, contact member 53a, conductor 69, contact member 11a, resistor 52 and resistor 49 to the negative side of the system. This current is of such a polarity as to cause the control relay 38 to operate to its energized position, closing contact member 38a and opening contact member 38b. The auxiliary control relay 56 is shunted down through contact member 38a, interrupting the operating circuit with the rheostat motor 28 at contact member 56d.

At the same time, contact member 56b closes, providing an energizing circuit for the closing relay 18, extending from positive through a control switch 68, and operating winding 19 of the closing relay, conductor 70, contact member 56b, contact member 11d of the circuit breaker, contact member 53b, conductor 71 and contact member 57a to negative. The closing relay provides an obvious energizing circuit for the operating winding 17 of the circuit breaker through contact member 18a. The circuit breaker is closed in the usual manner with the cutoff relay 20 being energized through contact member 11c to shunt down the closing relay.

When the circuit breaker 11 closes, raise and lower operating circuits are set up through contact members 11b and 11f, respectively at the same time the auxiliary control relay 57 is de-energized by the opening of contact member 11g, and operating winding 43 of the control relay 38 is disconnected from the bridge circuit including the resistors 45, 46, 48 and 49 by the opening of contact member 11a, and is connected in circuit relation with the shunt 55 and resistor 46 of the bridge circuit through contact member 11b. The control relay thereupon controls energization of the auxiliary control relay 56 so as to operate the rheostat motor 28 to regulate the voltage of the generator by selectively raising or lowering it. The direction of the voltage drop across the shunt 55 is such that an increase in load increases the current through the operating winding 43, causing the control relay 38 to close contact member 38a and shunt down the auxiliary control relay 56, and set up an operating circuit for the rheostat motor 28 so as to reduce the voltage of the generator 14. Accordingly, the load on the generator 14 is regulated, and the generator may be provided with a drooping operating characteristic, which limits the current on overloads and prevents a cold machine from assuming too large a percentage of the load when connected in parallel circuit relation with a hot machine.

If the load circuit is deenergized when the operating winding 43 of the control relay is connected between the terminal points 50 and 51, the circuit breaker 11 will be closed and the control relay will remain in the operating position until the voltage of the machine rises to the normal value, after which the relay operates to regulate the generator voltage.

Referring to Fig. 2, it will be seen that the system is substantially the same as shown in Fig. 1, except that polarizing winding 41 of the control relay 38 has been omitted, and the control relay 38' has only an operating winding 43'. The polarized characteristic is obtained by means of a unidirectional current or rectifier device 42, which may be connected in circuit relation with the operating winding 43' only when it is connected between the terminal points 50 and 51. This makes the relay 38' voltage directional. When it is connected in circuit relation with the shunt 55, the rectifier device is ineffective and the relay is non-polarized. Operation of a system embodying the modification shown in Fig. 2 is otherwise identical with that of the system shown in Fig. 1.

From the above description and the accompanying drawing, it will be apparent that I have provided an automatic reclosing system which is relatively simple and requires fewer control relays and devices responsive to circuit conditions than the reclosing circuits of the prior art. The reduction in the number of operating devices simplifies the maintenance, reduces the operating costs, and increases the reliability of the system. Instead of using a current limiting relay, a voltage regulating relay, a load shifting contactor, a voltage directional relay and other auxiliary relays, as in the systems of the prior art, only a single polarized control relay is used for performing all the functions of the relays heretofore used.

Since certain changes may be made in the above-described construction, and different embodiments of the invention may be made without departing from the spirit or scope thereof, it is intended that all the matter contained in the above description and shown in the accompanying drawing shall be considered as illustrative and not in a limiting sense.

I claim as my invention:

1. In a control system for a circuit breaker disposed to connect a load circuit to a power source of relatively high direct current voltage, voltage dividing means connected across the source including fixed resistance means adjacent the high voltage side of the source, additional voltage dividing means connected across the load circuit including fixed resistance means adjacent the high voltage side of the load circuit, and a control relay for the breaker connected between intermediate points on said voltage divider means on the low voltage side of the fixed resistance means.

2. A control system for a circuit breaker disposed to connect a load circuit to a relatively high voltage source of direct current electrical energy comprising, voltage divider means connected across the source and provided with an intermediate terminal point, said voltage divider means including a relatively high value fixed impedance between the intermediate terminal point and the positive terminal of the source, additional voltage divider connected across the load circuit and provided with an intermediate terminal point, said additional voltage divider means including a relatively high value fixed impedance between the intermediate terminal point and the positive terminal of the load circuit, and a polarized relay operable to control operation of the circuit breaker having an operating winding connected between said intermediate terminal points so that the relatively high value impedances prevent the operating winding from being subjected to the full voltage of either the source or the load circuit.

3. In a reclosing system, a circuit breaker disposed to connect a load circuit to a source of electrical energy, a voltage directional relay, a bridge circuit connected between the source and the load circuit including fixed resistance means adjacent the high voltage side of the source and the load circuit, circuit means operable in response to opening of the circuit breaker to connect the voltage directional relay in the bridge circuit on the low voltage side of the fixed resistance means, and additional circuit means responsive to predetermined operation of the directional relay to provide a closing circuit for the circuit breaker.

4. In a reclosing system for a circuit breaker disposed to connect a load circuit to a power source, a polarized relay, circuit means including a control device responsive to the voltage of the source operable to connect the polarized relay for effecting operation of the circuit breaker to connect the load circuit to the source in accordance with a predetermined direction of a voltage differential between the source and load circuit, control means operable to vary the voltage of the source, and circuit means controlled by the polarized relay in response to other than the predetermined direction of differential operable to increase the voltage of the source.

5. A reclosing system comprising, a circuit breaker disposed to connect a load circuit to a power source, a polarized relay, circuit means responsive to opening of the circuit breaker to connect the polarized relay in a bridge circuit between the source and load circuits, control means operable in response to predetermined operation of the polarized relay to effect closing of the circuit breaker, voltage control means operable to vary the voltage of the source, and circuit means responsive to closing of the circuit breaker operable to connect the polarized relay to effect operation of the voltage control means in accordance with the value of the load current.

6. A control system comprising, a circuit breaker operable to connect and disconnect a load circuit to and from a source of electrical energy, a closing relay operable to close the circuit breaker, trip means operable to open the circuit breaker, control means including a polarity sensitive relay operable to vary the voltage of the source, a voltage divider associated with the source, an additional voltage divider associated with the load circuit, circuit means including contact means operable in response to opening of the circuit breaker to connect the polarity sensitive relay between intermediate points on the voltage dividers, additional circuit means responsive to predetermined operation of the polarity sensitive relay to effect operation of the closing relay, and circuit means including contact means operable in response to closing of the circuit breaker to connect the polarity sensitive relay for energization in accordance with the current supplied to the load circuit in opposition to the energization thereof from the voltage divider associated with the source.

7. An automatic reclosing system for a circuit breaker disposed to connect a load circuit to a power source comprising, control means operable to vary the voltage of the source, a polarized relay connected to effect operation of the control means, circuit means including contact means responsive to opening of the circuit breaker and to the voltage of the source connecting the polarized relay in a bridge circuit between the source and the load circuit, additional circuit means connecting the circuit breaker for closing in response to predetermined operation of the polarized relay, and circuit means responsive to closing of the circuit breaker connecting the polarized relay for energization in accordance with the load current in opposition to the voltage of the source.

8. In an automatic reclosing system, a circuit breaker connecting a load circuit to a power source, control means responsive to opening of the circuit breaker to reduce the voltage of the source, a relay responsive to opening of the circuit breaker to effect operation of said control means to raise the voltage of the generator, voltage responsive means operable to connect the relay in a polarized bridge circuit between the source and the load circuit, circuit means responsive to operation of the relay when the voltage of the source exceeds that of the load circuit by a predetermined amount operable to effect closing of the circuit breaker, and circuit means responsive to closing of the circuit breaker connecting the relay to effect operation of the control means to regulate the voltage of the source in accordance with the load current.

9. A control system for a circuit breaker disposed to connect a load circuit to a power source comprising, a closing relay operable to effect closing of the circuit breaker, trip means operable to open the circuit breaker, a voltage divider connected across the source and provided with an intermediate terminal point, an additional voltage divider connected across the load circuit and having an intermediate terminal point, a polarized relay connected to the terminal point of said voltage divider across the source, circuit means including normally closed contact members and contact means responsive to the voltage of the source connecting the polarized relay between the terminal points of the voltage dividers when the circuit breaker is open, relay means responsive to predetermined operation of the polarized relay to effect operation of the closing relay, circuit means including contact members responsive to closing of the circuit breaker connecting the polarized relay for energization in accordance with the source voltage and the load current in opposite senses, and additional circuit means including contact members responsive to closing of the circuit breaker connecting the polarized relay to control the voltage of the source.

10. A control system for a circuit breaker disposed to connect a load circuit to a power source comprising, a control relay, circuit means connecting the control relay in a bridge circuit between the load circuit and the source to measure the direction of a differential voltage therebetween for effecting closing of the breaker, and additional circuit means connecting the control relay for energization in accordance with the voltage of the source and the current supplied to the load circuit when the breaker is closed.

11. A reclosing system for a circuit breaker disposed to connect a load circuit to a source comprising, a control relay, circuit means including a unidirectional current device operable to connect the relay in a bridge circuit between the source and the load circuit when the breaker opens, and additional circuit means connecting the control relay for energization independently of the unidirectional current device when the circuit breaker closes.

WILLIAM R. TALIAFERRO.

REFERENCES CITED

The following references are of record in the file of this patent:

UNITED STATES PATENTS

| Number | Name | Date |
|---|---|---|
| 1,786,792 | Thomas | Dec. 30, 1930 |